Patented Apr. 11, 1939

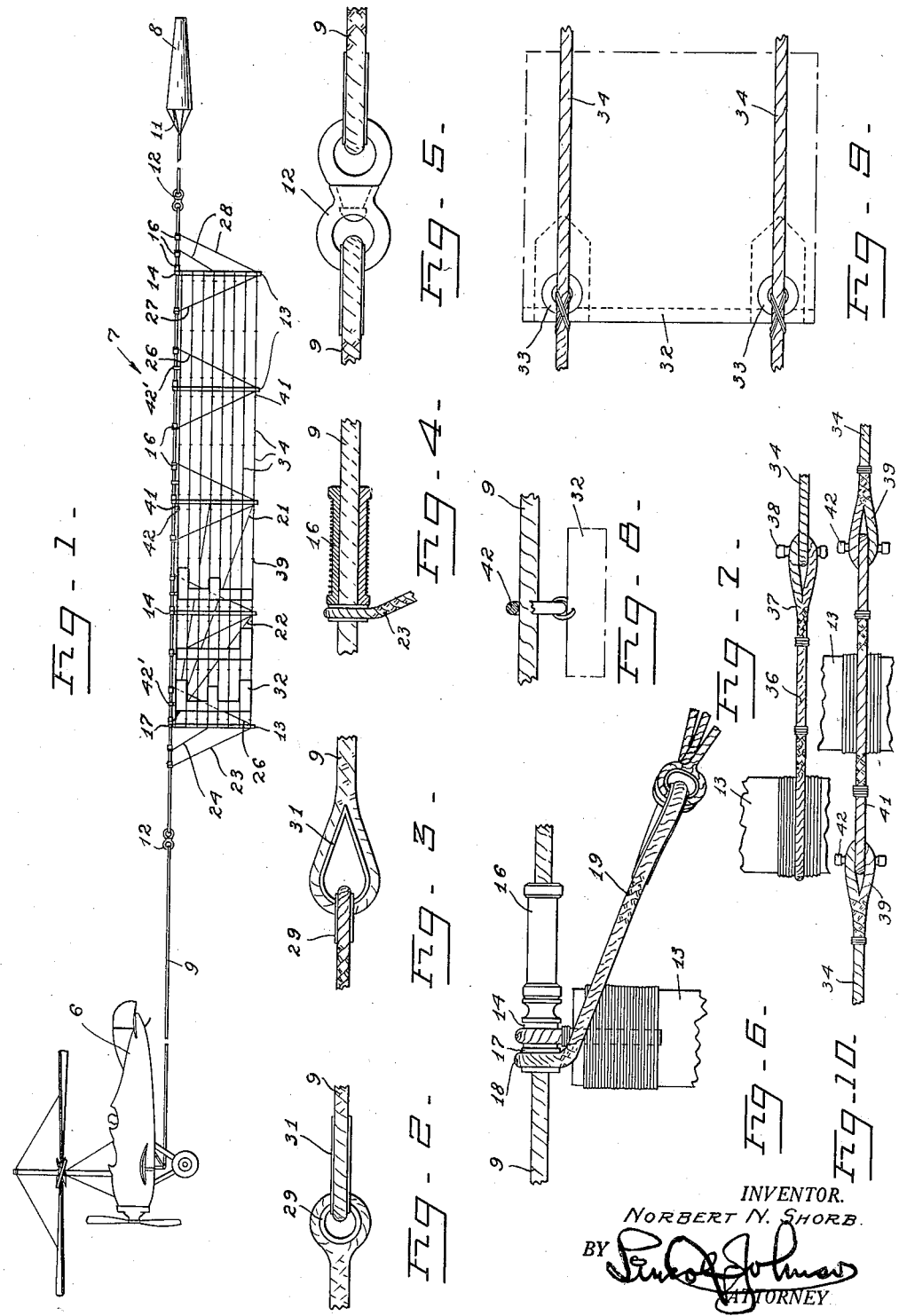

2,153,940

UNITED STATES PATENT OFFICE 2,153,940

AERIAL DISPLAY

Norbert N. Shorb, San Francisco, Calif., assignor, by mesne assignments, to Ralph H. Brandt, Los Angeles, Calif.

Application June 15, 1932, Serial No. 617,391

19 Claims. (Cl. 40—127)

This invention relates to an improved method of and device for displaying and flying aerial advertising displays.

One of the objects of the invention is to provide a simple and comparatively inexpensive attachment for aircraft, which is adapted to carry a freely suspended advertising display in tow.

Another object of the invention is to provide a comparatively long and flexible advertising display adapted to be towed by an aircraft in flight, means being provided to hold the display in a predetermined position in flight, and also to retard the falling of the display when the latter is released from the aircraft.

The herein invention includes special arrangements for the connection and support of the display on a towline so as to prevent excessive pull on the display proper and to obviate the fluttering or tearing of the display, the arrangement being such as to also permit the sign or display to bank at turns and thus eliminating any undue pull upon the aircraft.

Other objects and advantages are to provide an aerial display that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings,

Fig. 1 is a side elevation of an airplane having a sign mounted thereon in accordance with my invention.

Figs. 2, 3, 4 and 5 are enlarged views showing details of the various connections entering into the construction of the aerial display.

Fig. 6 is an enlarged side elevation of the manner of joining one of the sign masts to the supporting rope.

Fig. 7 is a detail showing the method of connecting one of the sign supporting ropes to the supporting masts.

Fig. 8 is a view showing the manner of joining one of the signs to the main supporting rope.

Fig. 9 is a front elevation showing a detail of a portion of one of the sign letters, and the manner of joining it to the supporting ropes.

Fig. 10 is a detail showing the manner of joining the letter supporting ropes to a mast.

In carrying out my invention, I make use of an aircraft of any type, preferably an airplane of the auto-gyro type shown and designated 6. A comparatively long, flexible advertising display denoted in its entirety by the numeral 7, is towed by the airplane 6. A wind vane 8, in the form of a sock, at the free end of the display 7 operates as a stabilizer to keep the display 7 in a predetermined line, preferably in the line of flight of the airplane 6.

As the airplane 6 takes off, it pulls the long display 7 therewith. The wind vane 8 is urged and held in its position by the slip stream of the airplane 6 so as to keep the display 7 tautly extended rearwardly of the plane 6, while the airplane is in flight. The display 7 may be cut off or released from the plane 6 at will, whereupon the wind vane 8 operates as a parachute on which the weight of the display 7 is suspended, so as to retard the fall of the latter.

In detail, my aerial display 7 includes a towline 9 suitably secured at one end thereof to the airplane 6, and at its other end to the stabilizer vane or sock 8. The open end 11 of the vane 8 faces toward the plane 6 to receive the slip stream therefrom. In order to compensate for any spinning of the flexible towline 9, the same may be made in sections, as shown, connected to each other, by properly treated or galvanized swivels 12. Such connection also compensates for the spinning of the stabilizer vane 8.

On the towline 9 between the airplane 6 and the stabilizer vane 8 are a plurality of masts 13. An end of each mast 13 is swivelably connected to the towline 9 so as to be freely suspended from the latter. Preferably a thimble 14 is seized to a loop at the end of each mast 13. The towline 9 is freely passed through the thimbles 14. The towline 9 is also provided with a plurality of ferrules 16, secured on the towline 9 in longitudinally spaced arrangement to operate as stops. There is such a ferrule 16 adjacent to the aft end of each thimble 14 to space the masts 13 and prevent the rearward sliding thereof as the display is flown in the slip stream of the airplane 6. Each ferrule 16 is made in two longitudinal half sections and is securely seized onto the towline 9.

A thimble 17 is provided on the towline 9 in front of the thimble 14 of the lead mast 13. On the thimble 17 is secured the eye splice 18 of a short line formed in two short bridles 19 leading aft. Each bridle 19 has an eye splice in its free end to receive the forward ends of stays 21 and 22. The stay 21 leads to the middle of the second mast 13 from the airplane 6, and to the base or free end of the third mast 13 from the front. The stay 22 extends to the base of the second mast 13 from the front.

Similar stays 23 and 24 lead from the base and middle of the lead mast 13 forwardly and upwardly to suitable thimbles on the towline 9. A stay 26 extends upwardly and rearwardly from the base of each mast 13 to be similarly attached to the line 9. The stays 23, 24 and 26 maintain the lead mast 13 at right angles to the line 9. Similarly the stays 21, 22 and 26 keep the second mast 13 from tilting out of its right angle position to the line 9. The stays 21 and 22 also reduce the possible strain on the stays 23 and 24 and allow the towline 9 to remain in a straight line of flight. The slip stream bearing against the underpart or base of the masts 13 would tend to exert a downward bending force at the point of connection of the stays 23 and 24 on the towline 9, this would force back the leading edge of the sign so as to urge the said point of the towline 9 downwardly and give the display a tendency to rotate or whirl. However, these forces are effectively equalized and neutralized by the use of said stays 21 and 22 to take up the stress of the second mast 13, and also by the stays 27, which extend forwardly and upwardly from all the masts 13 beyond the first mast to connect the bases of the intermediate masts 13 to the respective points of the towline 9 in the aforesaid manner. The manila thimbles 17 of each of these stays 26 and 27 are also stopped from sliding on the towline 9 by ferrules 16 of the type heretofore set forth.

The rear endmost mast 13 has rearwardly and upwardly extended stays 28 to connect to the towline 9 in the manner heretofore stated. Thus all the masts 13 are held in parallel spaced relation to each other by the respective stays, yet the masts 13 are rigidly and also swivelably suspended from the towline 9.

In addition to the swivel connections 12 in the towline 9, the latter is also made in smaller sections between the connections 12, which sections are connected to each other by a manila thimble 29 and a cable thimble 31, as shown in Figs. 2 and 3.

The sign on the advertising display is made up of a plurality of interchangeable elements, such as letters 32. Each letter 32 is made in a unit and is secured by suitable grommets 33 on parallel lines 34, so that the end of the lines 34 extend fore and aft from the letters 32 and form short connecting lines, whereby the letters 32 can be interchangeably connected into the display sign.

The lead mast 13 has a plurality of spaced short lines 36 extended therefrom. Each line 36 has an eye splice 37 formed at its end. The forward ends of the short lines 34 have a toggle 38 formed thereon for engagement with the respective eyes 37. The trailing ends of the lines 34 have eyes 39 formed thereon similarly to the eyes 37. Thus the short lines 34 of the successive sign units or elements can be readily and firmly united, yet remain easily interchangeable.

The intermediate masts 13 have fastening lines 41 extended forwardly and provided with toggles 42 for engagement with the eyes 39 of the adjacent unit or letter 32. In this manner, if desired, a plurality of letters or signs of a certain size may be secured between each pair of adjacent masts 13. From the uppermost line of each letter or unit 32, regularly spaced galvanized rings 42 are extended through which the towline 9 extends. The letters 32 may be secured on the lines 34 by the same grommets 33 so that the lines 34 remain constantly on the masts and form a permanent frame, or the lines 34 may be detached with the respective letters 32, as the case may be.

The structure of wind vane 8 may be of any standard construction, such as a sock or stabilizer in the form of a regular open end, conical army target sock, shown.

The display supported in the aforementioned manner is easily interchangeable, it forms a unitary swivelable sign on the towline suspended in such a way that the fouling of the display in the towline is positively obviated. The aerial display banks at turns and does not cause side slip of the towline airplane. The sign presents a smooth surface when the lines are taut, and the letters are protected from being torn by the even arrangement of their grommets on the short letter supporting lines. The stresses are equalized to prevent the fouling of the sign even if the towline whirls, although the sectional structure of the towline also prevents excessive twisting or whirling. The sign is readily visible at all angles. It can readily take off trailing an airplane, and it is adapted to descend slowly in extended position if cut loose from a flying aircraft.

Each of said letters or symbols 32 is made so that the height of the letters is considerably higher than the depth or width of the letters so that the ratio between the height of the letters which corresponds to the span of an airfoil to the depth or width of the strips which would correspond to the chord of an airfoil, is considerably higher than the same ratio would be if the symbols were made on full squares of material of the same overall dimensions. By reason of this high aspect ratio as the connected symbols or letters 32 are drawn by a force exerted in front of and above the center line of the sign, the individual lift of each of said symbols gives a cummulative high aspect ratio to the entire sign. Thus as each letter or symbol keeps its position by its own lift as it is being towed and actually causes the entire sign to require very little lift by stabilizing means at the tail end of the same. In other words the above arrangement when towed from a junction point of a saddle above the enter line of the sign produces its own lift so as to float freely in the air with very little assistance from rear end stabilizers.

Having thus described this invention, what I claim and desire to secure by Letters Patent is:

1. In an aerial advertising apparatus, the combination with a moving aircraft, of a flexible towline extended rearwardly from the aircraft, said towline being extended beyond the trailing end of the display, an advertising display suspended from the towline, and a hollow wind sock on the extension of said towline spaced behind the display to keep the line taut in a predetermined position when the airplane is in flight, said sock being adapted to be flown into the wind created by the flight of the aircraft.

2. The combination with an aircraft, a towline, a hollow wind sock on the towline spaced behind the aircraft to hold the latter taut in the line of flight of the aircraft, and an advertising sign suspended from the towline between the aircraft and the wind sock, said display being so arranged that the wind sock is spaced a suitable distance behind the trailing end of the display.

3. In combination with an aircraft in flight, a flexible towline, a hollow wind vane on the towline adapted to be filled with air from the slip stream of the aircraft to hold the towline substantially in the line of flight, a plurality of masts swivelably suspended on the towline between the aircraft and the wind vane, stops on the towline arranged to prevent the displacement of the masts along the towline, means to hold the masts in a predetermined spaced position, and an advertising display detachably secured to said masts.

4. In combination with an aircraft in flight, a flexible towline, a hollow wind vane on the towline adapted to be filled with air from the slip stream of the aircraft to hold the towline substantially in the line of flight, a plurality of masts swivelably suspended on the towline between the aircraft and the wind vane, stops on the towline arranged to prevent the displacement of the masts along the towline, means to hold the masts in a predetermined spaced position, and a plurality of advertising display elements detachably connected to each other and to the said masts on the towline.

5. A frame for aerial advertising displays comprising a towline extended from an aircraft and held substantially in the line of flight, a plurality of stops fixedly spaced on the line, a plurality of masts swivelably suspended from the towline adjacent certain stops, means secured to the towline at the other stops and to the respective masts to hold the masts in substantially parallel spaced relation, and sectional means to secure advertising displays between the respective masts.

6. The combination with a flexible line extended from an aircraft, and a display suspended on said line so as to be disposed below the line; of a wind sock on the said line spaced beyond the trailing end of the display to hold the line substantially in the line of flight of the aircraft when the latter is in flight, said wind sock being arranged coaxially with said towline.

7. In an aerial advertising display on an aircraft, a towline on the aircraft, stops on the towline, a plurality of masts swivelably suspended from the line at certain of said stops; stays extending from other stops rearwardly to the free ends and to intermediate points of the respective masts, said stays being swivelably supported on the towline at the said second stops and arranged to hold the masts in substantial parallelism with each other, and displays detachably secured to said masts.

8. In an aerial advertising display on an aircraft, a towline on the aircraft, stops on the towline, a plurality of masts swivelably suspended from the line at certain of said stops; stays extending from other stops rearwardly to the free ends and to intermediate points of the respective masts, said stays being swivelably supported on the towline at the said second stops and arranged to hold the masts in substantial parallelism with each other, displays detachably secured to said masts, and a bag on the end of the towline open at its fore-end to hold the towline straight when in flight and being adapted to retard the dropping of the display when the towline is released from the aircraft.

9. In an aerial advertising display the combination with a flexible towline extended from an aircraft, and a frame formed on the towline; of a plurality of display elements, short support lines extended from the masts, an eye splice on the free end of each short line, toggle lines extended from an edge of each of the said elements for engaging the respective eyes; and eyes extended from the opposite edge of each element to be engaged by the toggles of the adjacent element; and means on the masts to detachably engage the rear edge of the rearmost display element.

10. In an aerial display apparatus, a tow line connected to an aircraft, a display connected to the tow line, a stay extended from the leading end of the display to the tow line, means to slidably connect said stay to the tow line, and means to limit the rearward sliding of said connecting means and said stay relatively to the tow line.

11. In an aerial display apparatus, a tow line connected to an aircraft, a display web connected to the tow line, a bridle forwardly extended from the display, a connection member for the bridle being slidable on the tow line, and a stop on the tow line to limit the rearward motion of said connection member relatively to the tow line.

12. The combination with an aircraft and an aerial display towed by the aircraft, said display including a plurality of stringers extending generally longitudinally of the display, and a plurality of spacer elements spaced with respect to each other and extending generally transversely of said stringers, there being a spacer element at the leading end of the display, of a diagonal tension member operatievly interconnecting the upper end of the leading spacer element with the lower end of an intermediate spacer element thereby to transmit some of the towing force from the upper end of said leading spacer element to a lower stringer at a point behind the leading spacer element.

13. In an aerial display apparatus, towed by an aircraft, a plurality of parallel stringers extending longitudinally of the apparatus, a plurality of spacer bars spaced from each other and extended transversely of the stringers and connected to said stringers at their points of intersection, a diagonal tension member extended substantially from the upper end of the leading spacer bar to the lower end of an intermediate spacer bar, and means to connect the leading end of the apparatus to the aircraft.

14. In an aerial display apparatus, a display frame, display symbols on the frame, a tow line connected to an aircraft at its leading end, means to suspend the display on the tow line, said tow line being made of a plurality of sections, means to swivelably connect the adjacent ends of said tow line sections to each other, and means to keep the tow line sections taut in flight.

15. The combination with a flexible line extended from an aircraft, and a display suspended on said line so as to be disposed below the line; of a wind sock on the said line spaced beyond the trailing end of the display to hold the line substantially in the line of flight of the aircraft when the latter is in flight, said wind sock being arranged coaxially with said tow line, and tension members connected to the display and to the tow line to transmit some of the towing force to the lower edge of the display.

16. In an aerial display apparatus a display frame, a tow line adapted to be connected to an aircraft, means to connect the display frame to the tow line, said display frame including transverse spaced stiffening members, and a plurality of spaced longitudinal lines each of said longitudinal lines being formed of a plurality of sections connected to each other end to end and secured to the stiffening members at the respective points of intersection, and symbols secured to said sectional lines.

17. In an aerial display apparatus a display frame, a tow line adapted to be connected to an aircraft, means to connect the display frame to the tow line, said display frame including transverse spaced stiffening members, and a plurality of spaced longitudinal lines, each of said longitudinal lines being formed of a plurality of sections, means to detachably connect the adjacent ends of the sections in each line to each other, means to connect said lines to the respective stiffening members, and symbols held on the respective sections of said lines.

18. The combination with an airplane or other type of air vessel, of a body designed to be trailed from the air vessel, a cable for coupling one side of the body with the air vesel, a universal joint connection between the cable and the said body, means for coupling the other end of the cable with the air vessel, a universal joint connection at the other side of the body, and a hollow tubular stabilizing element connected with the second mentioned universal joint connection.

19. The combination with an airplane or other type of air vessel, of a body designed to be trailed from the air vessel, a cable for coupling one side of the body with the air vessel, a universal joint connection between the cable and the said body, means coupling the other end of the cable with the air vessel whereby the cable may be released from the vessel while the latter is in the air, a universal joint connection at the other side of the body, and a stabilizing device connected with the second mentioned universal joint for assisting in maintaining the body at a desired position in the air.

NORBERT N. SHORB.